(12) United States Patent
Roy Chowdhury et al.

(10) Patent No.: US 11,145,067 B2
(45) Date of Patent: *Oct. 12, 2021

(54) METHODS AND SYSTEMS FOR PROVIDING FAST SEMANTIC PROPOSALS FOR IMAGE AND VIDEO ANNOTATION

(71) Applicant: Volvo Car Corporation, Gothenburg (SE)

(72) Inventors: Sohini Roy Chowdhury, Santa Clara, CA (US); Srikar Muppirisetty, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,019

(22) Filed: May 26, 2020

(65) Prior Publication Data

US 2020/0286241 A1  Sep. 10, 2020

Related U.S. Application Data

(63) Continuation of application No. 16/125,362, filed on Sep. 7, 2018, now Pat. No. 10,706,557.

(51) Int. Cl.
*G06T 7/194* (2017.01)
*G06T 7/90* (2017.01)
(Continued)

(52) U.S. Cl.
CPC ............ *G06T 7/194* (2017.01); *G05D 1/0088* (2013.01); *G05D 1/0246* (2013.01);
(Continued)

(58) Field of Classification Search
CPC ......... G06T 7/194; G06T 7/90; G05D 1/0088; G05D 1/0246; G06K 9/3233; G06K 9/6202; G06K 9/4623
See application file for complete search history.

(56) References Cited

U.S. PATENT DOCUMENTS

| 2015/0139499 A1* | 5/2015 | Shimizu | G06T 5/50 |
| | | | 382/104 |
| 2018/0253640 A1* | 9/2018 | Goudarzi | G06N 3/0454 |
| 2019/0380684 A1* | 12/2019 | Insana | G01S 15/50 |

OTHER PUBLICATIONS

Wu, Jiajun et al. "Milcut: A sweeping line multiple instance learning paradigm for interactive image segmentation." In Proceedings of the IEEE Conference on Computer Vision and Pattern Recognition, pp. 256-263. 2014.

(Continued)

*Primary Examiner* — Asghar H Bilgrami
(74) *Attorney, Agent, or Firm* — Clements Bernard Walker; Christopher L. Bernard (57) ABSTRACT

Methods and systems for providing fast semantic proposals for image and video annotation including: extracting image planes from an input image; linearizing each of the image planes to generate a one-dimensional array to extract an input feature vector per image pixel for the image planes; abstracting features for a region of interest using a modified echo state network model, wherein a reservoir increases feature dimensions per pixel location to multiple dimensions followed by feature reduction to one dimension per pixel location, wherein the echo state network model includes both spatial and temporal state factors for reservoir nodes associated with each pixel vector, and wherein the echo state network model outputs a probability image; post-processing the probability image to form a segmented binary image mask; and applying the segmented binary image mask to the input image to segment the region of interest and form a semantic proposal image.

20 Claims, 10 Drawing Sheets

(51) Int. Cl.
  *G05D 1/00* (2006.01)
  *G05D 1/02* (2020.01)
  *G06K 9/32* (2006.01)
  *G06K 9/62* (2006.01)
  *G06K 9/46* (2006.01)

(52) U.S. Cl.
  CPC ......... *G06K 9/3233* (2013.01); *G06K 9/6202* (2013.01); *G06T 7/90* (2017.01); *G06T 2207/20081* (2013.01); *G06T 2207/20132* (2013.01); *G06T 2207/30252* (2013.01)

(56) References Cited

OTHER PUBLICATIONS

Alpert, Sharon et al. "Image segmentation by probabilistic bottom-up aggregation and cue integration." In Computer Vision and Pattern Recognition, 2007. CVPR'07. IEEE Conference on, pp. 1-8. IEEE, 2007.

Kovesi, Peter. "Image segmentation using SLIC superpixels and DBSCAN clustering." University of Western Australia, Center for Exploration Targeting, Image Analysis Group (2013).

Sivaraman, Sayanan et al "A general active-learning framework for on-road vehicle recognition and tracking." IEEE Transactions on Intelligent Transportation Systems 11, No. 2 (2010): 267-276.

Satzoda, Ravi Kumar et al. "Efficient lane and vehicle detection with integrated synergies (ELVIS)" In Computer Vision and Pattern Recognition Workshops (CVPRW), 2014 IEEE Conference on, pp. 708-713. IEEE, 2014.

Zhou, Bolei et al. "Scene parsing through ade20k dataset." In Proceedings of the IEEE Conference on Computer Vision and Pattern Recognition, vol. 1, No. 2, p. 4. IEEE, 2017.

Koprinkova-Hristova, Petia et al. "Clustering of spectral images using Echo state networks." In Innovations in Intelligent Systems and Applications (INISTA), 2013 IEEE International Symposium on, pp. 1-5. IEEE, 2013.

Souahlia, Abdelkerim et al. "An experimental evaluation of echo state network for colour image segmentation." In Neural Networks (IJCNN), 2016 International Joint Conference on, pp. 1143-1150. IEEE, 2016.

Meftah, Boudjelal et al. "Novel approach using echo state networks for microscopic cellular image segmentation." Cognitive Computation 8, No. 2 (2016): 237-245.

Souahlia et al.," Blood vessel segmentation in retinal imaged using echo state networks", Feb. 4-6, 2017, pp. 1-8.

Chowdhury et al., "Fast proposals for image and video annotation using modified echo state networks.", 2018, pp. 1-6.

Jan. 24, 2020 European Search Report issued on International Application 19195157.

\* cited by examiner

| Dataset: | Weizmann 2 Object dataset | | | |
|---|---|---|---|---|
| Method | Modified ESN [3x3] (Proposed) | Baseline ESN (Proposed) | Wu et. Al. (2014)[1] | Alpert et. Al. (2007)[2] |
| F_score/Time | 0.72/1.1s | 0.694/0.4s | 0.71/5-10s | 0.68 (1-2 magnitudes slower than Wu et. Al.) |

| Dataset: | LISA Vehicle Detection Dataset Urban | | | |
|---|---|---|---|---|
| Method | Modified ESN [3x3] (Proposed) | Baseline ESN (Proposed) | Sivaraman et. Al. (2010) [4] | Satzoda et al (2014) [5] |
| TPR/FDR | 1/0.45 | 0.99/0.57 | 0.835/0.797 | 1/0.531 |

| Dataset: | LISA Vehicle Detection Dataset Sunny | | | |
|---|---|---|---|---|
| TPR/FDR | 0.98/0.41 | 0.975/0.49 | 0.981/0.458 | 0.97/0.267 |

FIG. 10

METHODS AND SYSTEMS FOR PROVIDING FAST SEMANTIC PROPOSALS FOR IMAGE AND VIDEO ANNOTATION

CROSS-REFERENCE TO RELATED APPLICATION

The present disclosure is a continuation (CON) of co-pending U.S. patent application Ser. No. 16/125,362, filed on Sep. 7, 2018, and entitled "METHODS AND SYSTEMS FOR PROVIDING FAST SEMANTIC PROPOSALS FOR IMAGE AND VIDEO ANNOTATION," the contents of which are incorporated in full by reference herein.

TECHNICAL FIELD

The present disclosure relates generally to methods and systems for providing fast semantic proposals (i.e., pre-proposals) for image and video annotation. More specifically, the present disclosure relates to methods and systems for providing fast semantic proposals for image and video annotation using modified echo state networks (ESNs). The methods and systems of the present disclosure find particular applicability in the training and testing of driver assist (DA) and autonomous driving (AD) systems in the automotive and active safety fields.

BACKGROUND

The deep learning (DL) field has gained significant attention over the last few years due to its implementation in a wide variety of applications. Deep neural networks (DNNs) require numerous training samples to converge to and produce significant output results. These training samples must be annotated and must be of very high quality for the successful implementation of such DNNs. One challenge is producing large numbers of training samples with high-quality annotated data.

One particular application of DNNs is in the training and testing of DA and AD systems in the automotive and active safety fields. These systems require large amounts of annotated image data to train and test the various functionalities, such as object detection, drivable surface recognition, semantic segmentation, and object tracking using camera and video images. The main challenge in using manually-annotated image data for these tasks is twofold. First, manually-annotated image data is expensive in terms of the time and expertise required to segment regions of interest (ROIs). Thus, there is a need to obtain fast and accurate semantic proposals from minimally-supervised and/or active learning algorithms that reduce manual annotation time and cost. Second, the scalability of algorithms across datasets is often a challenge. A proposal generation algorithm that works with one dataset may not provide the same performance with another dataset. Thus, there is a need for a generalizable proposal algorithm with low computational complexity.

Typically, DL algorithms are capable of extracting high-level features from images and videos by tapping into the local and global-level spatial characteristics. However, such DL algorithms require a large number of training samples to adequately learn and perform. As an alternative, ESNs are capable of high-level feature abstraction from a small number of image frames. ESNs have been studied quite extensively and have been applied in numerous fields for other purposes. The primary assumption made related to existing ESNs for semantic image segmentation is that all images in the dataset under consideration have similar spatial orientations and segmentation objectives. This assumption leads to the inherent property of ESNs that, at the end of a training batch of images, the reservoir nodes achieve a steady state, regardless of the initial conditions. However, semantic segmentation tasks cannot always assure similar spatial and/or intensity orientations and often the segmentation objectives can vary. For instance, images acquired by mobile phones with centralized objects of interest for foreground segmentation tasks must be treated separately from wide-angle scenery images acquired from vehicle cameras with the objectives of object and drivable surface segmentation tasks.

More generally, various works have been developed over the years to incorporate image segmentation using graph cut-techniques. These works segment each image into several super-pixel regions, followed by the identification of each region as a positive or negative bag region. All regions that are identified as positive bags are combined to generate the desired ROI. The disadvantage of this process is that it is slow, due to the super-pixel implementation, and lacks scalability. Other works utilize probabilistic measures and textural features in image sub-regions to decide whether to include each sub-region in the ROI. This process utilizes pixel intensity and texture along with a graph-based approach for image segmentation. The process, although minimally supervised, relies heavily on handcrafted intensity and textural features and fails to extract high-level features from multiple image planes.

Other works propose the use of super-pixel segmentation followed by the implementation of a density-based spatial clustering of applications with noise (DBSCAN) algorithm and some spatial priors to segment a ROI. This process is again slow due to the super-pixel segmentation process and lacks scalability. Other works introduce a two-round active learning framework to learn from video sequences and enable object racking using a dataset. This framework performs offline learning using wavelets and a classifier and applies particle filtering to track multiple objects. This process lacks scalability across datasets and requires large sets of training data (e.g., several thousand samples of objects) to update the system.

Other works first isolate object bounding boxes using a bird's-eye-view (BEV) plane followed by feature extraction and a classifier to eliminate false detections. This method also requires a large number of training samples for classification and lacks generalizability. Several benchmarking datasets have been publicly made available for object segmentation tasks, such as the Weizmann 1 and 2 object segmentation datasets, the ADE 20K dataset from MIT, and the LISA vehicle detection dataset. Some prior works have focused on utilizing ESNs for image segmentation by utilizing the reservoir states as features for classification and readout. However, all of these methods lack scalability and fail to utilize spatial neighborhood-based features for high-level feature abstraction.

It will be understood that this background provides and exemplary context and environment in which the methods and systems of the present disclosure are implemented. However, the methods and systems of the present disclosure may be implemented in other contexts and environments equally.

SUMMARY

Thus, fast and accurate pre-proposals that can be obtained by minimally-supervised or active learning algorithms can largely reduce the time taken for manual annotation tasks.

The present disclosure utilizes an active learning framework that can iteratively learn to segment foreground and background ROIs.

Typically, deep learning algorithms are found to be capable of extracting high-level features from images and/or videos by tapping into the local and global-level spatial characteristics. However, deep learning algorithms require a large number of training samples to learn. The present disclosure utilizes a recurrent neural network-like setup that is capable of high-level feature abstraction from a very small number of image frames. This proposed framework is generalizable for images and video frame annotation, segmentation, and video interpolation tasks.

The present disclosure provides for the batch-wise training of ESNs that are modified to incorporate spatial and neighborhood-based features from images with similar orientations and segmentation objectives. These ESN modifications enable region-specific feature abstraction from a small set of training images, such that hybrid features specific to a variety of segmentation objectives can be quickly learned per training batch and applied to a large test set thereafter. This framework is generalizable for images and video frame annotation, segmentation, and interpolation tasks.

The ESN architecture is modified to incorporate both spatial and temporal features, not only from within an image, but also from across a batch of training images. This modified ESN architecture significantly increases the accuracy of semantic segmentation across a variety of datasets.

A mechanism for the modified ESN network to generate neighborhood region per image-pixel is provided to create larger feature vectors per image-pixel. A fast neighborhood feature extraction process is also provided that eliminates the need to query the two-dimensional neighborhood for each pixel, thereby minimizing computational time complexity.

The modified ESN framework generates very fast segmentation pre-proposals (e.g., 1 second per image) by utilizing only 20-30% of a dataset for training and testing on the remaining 70-80% of the dataset. Furthermore, this architecture is scalable across a variety of datasets and segmentation objectives across images and video sequences.

Again, vision-related machine learning models for DA and AD systems require annotated images to train the models for automated detection tasks. The proposed framework is capable of quickly learning the segmentation objective from a small set of images and providing segmentation pre-proposals for foreground, object, and region segmentation tasks across images and video sequences. This framework is highly optimized for iteratively processing small batches of images using a feature readout mechanism and is capable of high-level feature abstraction from multiple color image planes using an ESN architecture that has been modified to incorporate spatial and temporal characteristics across image frames.

The proposed ESN architecture is modified to accept spatial and temporal features within an image and across a batch of images. The neighborhood region per image-pixel is utilized to generate larger feature vectors per image-pixel, followed by feature dimension increase and dimension reduction steps. This modification significantly increases the accuracy of regional segmentation across a variety of datasets. The process to extract neighborhood-region information per pixel for larger feature vector generation is an optimized process. The proposed framework is capable of generating segmentation pre-proposals in about 1 second per image by learning from only 20-30% of a data set and testing on the remaining 70-80% of the dataset. The proposed framework is highly scalable and generalizable across a variety of datasets.

In one aspect, a method for providing fast semantic proposals for image and video annotation includes: given an input image to be segmented for a region of interest, extracting one or more image planes from the input image; linearizing each of the one or more image planes to generate a one-dimensional array corresponding to the one or more image planes to extract an input feature vector per image pixel for the one or more image planes; abstracting features for the region of interest using a modified echo state network model utilizing a reservoir including a layer of connections between reservoir nodes, wherein the reservoir increases feature dimensions per pixel location to multiple dimensions followed by feature reduction to one dimension per pixel location, wherein the echo state network model includes both spatial and temporal state factors for the reservoir nodes associated with each pixel vector, and wherein the echo state network model outputs a probability image that is thresholded; post-processing the probability image by discarding small area regions then using one or more of morphological filling of holes or bounding box estimation to form a segmented binary image including the region of interest. The region of interest includes one or more of a foreground object, a drivable surface, and a trackable object. The one or more image planes include one or more of a red-green-blue image plane, a median-filtered grayscale image plane, a gradient-filtered grayscale image plane, a hue-saturation-lightness color plane, a hue-saturation-value color plane, and a Lab color plane. The echo state network model incorporates spatial characteristics from both neighboring pixels in a same input image and similar pixels from a previous input image. The input image is part of a batch of data selected from a larger dataset of frames and only the batch of data is used to form the semantic proposal image. The echo state network model utilizes contributions of a d×d spatial grid around each pixel to generate an input feature vector per pixel, such that a total number of features extracted per pixel location is of dimension $d^2 \times n$. The echo state network model utilizes a function overloading mechanism to readout a feature vector per pixel by padding edges of an image with columns/rows of zeros to form a zero-padded image and invoking a cropping function to generate sub-images from the zero-padded image and overloading a feature readout function to generate feature vectors corresponding to each pixel location from the sub-images generated by the cropping function. The semantic proposal image is used to train or test one or more of a driver assist system and an autonomous driving system.

In another aspect, a system for providing fast semantic proposals for image and video annotation includes an extraction algorithm executed on a processor operable for, given an input image to be segmented for a region of interest, extracting one or more image planes from the input image; a linearization algorithm executed on the processor operable for linearizing each of the one or more image planes to generate a one-dimensional array corresponding to the one or more image planes to extract an input feature vector per image pixel for the one or more image planes; a feature abstraction algorithm executed on the processor operable for abstracting features for the region of interest using a modified echo state network model utilizing a reservoir including a layer of connections between reservoir nodes, wherein the reservoir increases feature dimensions per pixel location to multiple dimensions followed by feature reduction to one dimension per pixel location, wherein the echo state network model includes both spatial and temporal state factors for the reservoir nodes associated with each pixel vector, and wherein the echo state network model outputs a probability image that is thresholded; a post-processing algorithm executed on the processor operable for post-processing the probability image by discarding small area regions then using one or more of morphological filling of holes or bounding box estimation to form a segmented binary image including the region of interest that serves as a semantic proposal image. The region of interest includes one or more of a foreground object, a drivable surface, and a trackable object. The one or more image planes include one or more of a red-green-blue image plane, a median-filtered grayscale image plane, a gradient-filtered grayscale image plane, a hue-saturation-lightness color plane, a hue-saturation-value color plane, and a Lab color plane. The echo state network model incorporates spatial characteristics from both neighboring pixels in a same input image and similar pixels from a previous input image. The input image is part of a batch of data selected from a larger dataset of frames and only the batch of data is used to form the semantic proposal image. The echo state network model utilizes contributions of a d×d spatial grid around each pixel to generate an input feature vector per pixel, such that a total number of features extracted per pixel location is of dimension $d^2 \times n$. The echo state network model utilizes a function overloading mechanism to readout a feature vector per pixel by padding edges of an image with columns/rows of zeros to form a zero-padded image and invoking a cropping function to generate sub-images from the zero-padded image and overloading a feature readout function to generate feature vectors corresponding to each pixel location from the sub-images generated by the cropping function. The semantic proposal image is used to train or test one or more of a driver assist system and an autonomous driving system.

In a further aspect, a non-transitory computer-readable medium includes fast semantic image annotation proposal instructions stored in memory and executed by a processor to perform the steps including: given an input image to be segmented for a region of interest, extracting one or more image planes from the input image; linearizing each of the one or more image planes to generate a one-dimensional array corresponding to the one or more image planes; abstracting features for the region of interest using a modified echo state network model incorporating spatial and temporal features from within the image and from across a batch of training images with similar orientations and segmentation objectives; and, based on the extracting, linearizing, and feature abstracting, providing a fast semantic proposal for image or video annotation using a reduced dataset. The step of linearizing each of the one or more image planes to generate the one-dimensional array corresponding to the one or more image planes includes extracting an input feature vector per image pixel for the one or more image planes. The step of abstracting the features for the region of interest using the modified echo state network model includes utilizing a reservoir including a layer of connections between reservoir nodes, wherein the reservoir increases feature dimensions per pixel location to multiple dimensions followed by feature reduction to one dimension per pixel location, wherein the echo state network model includes both spatial and temporal state factors for the reservoir nodes associated with each pixel vector, and wherein the echo state network model outputs a probability image that is thresholded.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF EMBODIMENTS

Again, the present disclosure provides for the batch-wise training of ESNs that are modified to incorporate spatial and neighborhood-based features from images with similar orientations and segmentation objectives. These ESN modifications enable region-specific feature abstraction from a small set of training images, such that hybrid features specific to a variety of segmentation objectives can be quickly learned per training batch and applied to a large test set thereafter. This framework is generalizable for images and video frame annotation, segmentation, and video interpolation tasks.

The ESN architecture is modified to incorporate both spatial and temporal features, not only from within an image, but also from across a batch of training images. This modified ESN architecture significantly increases the accuracy of semantic segmentation across a variety of datasets.

A mechanism for the modified ESN network to generate neighborhood region per image-pixel is provided to create larger feature vectors per image-pixel. A fast neighborhood feature extraction process is also provided that eliminates the need to query the two-dimensional neighborhood for each pixel to minimize the computational time complexity.

The modified ESN framework generates very fast segmentation proposals (e.g., 1 second per image) by utilizing only 20-30% of a dataset for training and testing on the remaining 70-80% of the dataset. Furthermore, this architecture is scalable across a variety of datasets and segmentation objectives across images and video sequences.

Again, vision-related machine learning models for DA and AD systems require annotated images to train the models for automated detection tasks. The proposed framework is capable of quickly learning the segmentation objective from a small set of images and providing segmentation pre-proposals for foreground, object, and region segmentation tasks across images and video sequences. This framework is highly optimized for iteratively processing small batches of images using a feature readout mechanism and is capable of high-level feature abstraction from multiple color image planes using an ESN architecture that has been modified to incorporate spatial and temporal characteristics across image frames.

The proposed ESN architecture is modified to accept spatial and temporal features within an image and across a batch of images. The neighborhood region per image-pixel is utilized to generate larger feature vectors per image-pixel, followed by feature dimension increase and dimension reduction steps. This modification significantly increases the accuracy of regional segmentation across a variety of datasets. The process to extract neighborhood-region information per pixel for larger feature vector generation is an optimized process. The proposed framework is capable of generating segmentation pre-proposals in about 1 second per image by learning from only 20-30% of a data set and testing on the remaining 70-80% of the dataset. The proposed framework is highly scalable and generalizable across a variety of datasets.

Figure 1:
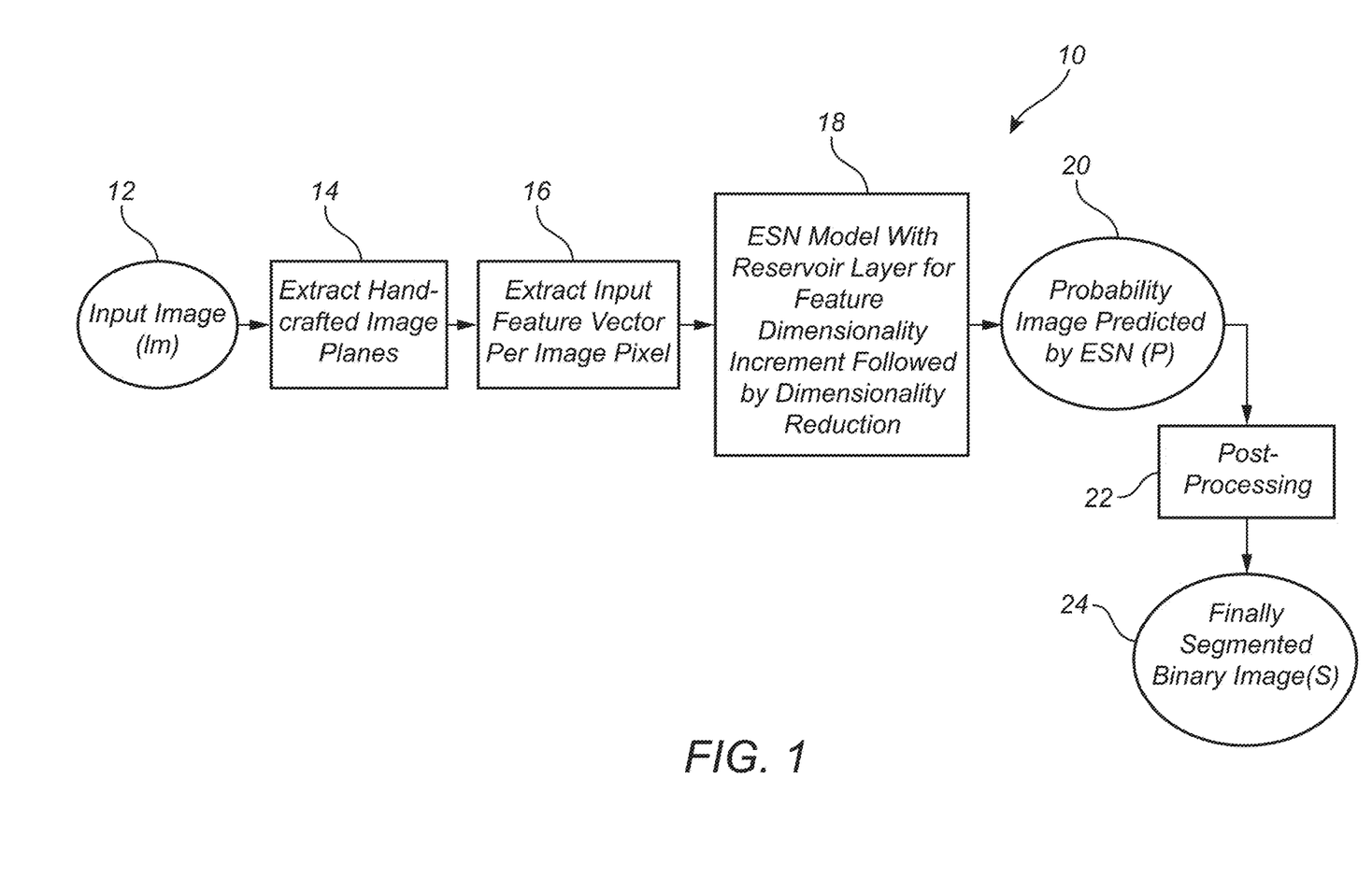
FIG. 1 is a flowchart illustrating the operation of the system for providing fast semantic pre-proposals for image and video annotation of the present disclosure.

Referring now specifically to FIG. 1, the system 10 of the present disclosure utilizes an input image (I) 12 that includes any digital images or video frames that need to be segmented for any ROI, such as foreground objects, drivable surfaces, trackable objects, etc. Since most camera images are red, green, and blue (RGB) plane images, some other color planes can provide significant region segmentation features, such as a median-filtered grayscale image plane, a gradient-filtered grayscale image plane, the HSL, HSV, and Lab color planes, etc. 'n' such handcrafted planes are thus first extracted per image 14.

Next, each 2-D image 12 is linearized in row-major order to generate a 1-D array corresponding to each image plane 16. So, if an image 12 had dimensions [200×200] and (n=5) color image planes were extracted in the first step above, the extracted input features would create a matrix of dimension [5×40000], where each column represents a unique pixel position and is represented by a [5×1] vector. Each pixel has exactly 9 neighbors in a 3×3 spatial grid. Similarly, considering a larger spatial neighborhood grid of dimensions [d×d] around each pixel, where d={3, 5, 7, 9, . . . }, the total number of features extracted per pixel position would be [d×d×n]. For example, considering the [3×3] spatial neighborhood per pixel, one can create a matrix of [45×40000], where each pixel is represented by a [(3×3×n)×1]=[45×1] vector. Similarly, if a [5×5] neighborhood area per pixel is used to create feature vector per pixel, then the dimension of feature vector per pixel becomes [(5×5×n)×1]=[125×1].

The ESN model 18 contains a single layer of sparse connections between 'm' nodes, called the reservoir, such that 'm'>dimensions of the input pixel feature vector (n, 9n, or 25n, based on the extent of neighborhood information extracted per pixel). The input feature vector is fed to the reservoir. The reservoir increases the feature dimensions per pixel location to [m×1] followed by feature reduction to [1×1] per pixel position. Thus, a probability image 20 is generated by the ESN model 18. The formulation of the ESN model 18 is modified and optimized to include spatial and temporal state-updates of reservoir nodes to each pixel vector. The probability image (P) is generated by rearranging the posterior probabilities per pixel (y) per image into the original image dimensions. 20 is a probabilistic image that is output from the ESN model 18 such that all pixel values are within the range [0, 1]. Thresholding and post-processing this image 20 results in a binary masked region containing the ROI.

The probability image 20 predicted by ESN model 18 per input image 12 is thresholded, followed by some minimal post-processing steps 22 that include the discarding any small regions with area <20 pixels, then morphological filling of holes or bounding box estimation for example. In some instances, a spatial preference for the ROI may also be enforced. For instance, to segment a drivable surface, regions that are close to the bottom horizontal edge of an image are retained while other smaller regions are discarded.

The initially segmented binary image (P) 24 is a final binary mask corresponding to the ROI that is generated after the thresholding and simple post-processing of the image.

The typical formulation of an ESN on time series data is:

$$x(t)=(1-\alpha)x(t-1)+\alpha f(W_{in}u(t)+W_{res}x(t-1)) \quad (1)$$

$$y(t)=W_{out}\vec{z(t)}, \text{ where } \vec{z(t)}=[1;u(t);x(t)] \quad (2)$$

$$W_{out}=(Z^TZ+\lambda I)^{-1}(Z^TY), Z|\vec{z}(t)\in Z \quad (3)$$

The proposed modification incorporates spatial and temporal state updates. Note: $x_i^j(k)$: state vector of the reservoir for pixel 'k' with respect to pixel 'j' in the 'i' th previous image. So, $x_0^k(k)$ refers to the state vector of the reservoir for pixel 'k' with respect to itself in the current image under analysis, $x_0^{k-1}(k)$ refers to the state vector of the reservoir for pixel 'k' with respect to the previous pixel in the current image under analysis, and $x_{-1}^k(k)$ refers to the state vector of the reservoir for pixel position 'k' with respect to the same pixel position in the image that was processed before the current image. Thus:

$$x_0^k(k)=(1-\alpha)x_0^{k-1}(k)+\alpha f(W_{in}u(k)+W_{res}x_{-1}^k(k)) \quad (1a)$$

$$y(k)=W_{out}\vec{s(k)}, \text{ where, } \vec{z(k)}=[1;u(k);x_0^k(k)] \quad (2a)$$

$$W_{out}=(\Sigma_{l=1}^L \vec{z_l(k)}\vec{z_l}(k)^T+\lambda I)^{-1}(\Sigma_{l=1}^L \vec{z}(k))(y(k)) \quad (3a)$$

where L=number of training images.

An important aspect here is the variation from (1) to (1a) to incorporate spatial characteristics from neighboring pixels in the same image and similar pixels from the previous image, as well as Increasing the size of the input vector from u(t) in (2) to u(k) in (2a), as well as the batch processing step (from (3) to (3a)) for optimal memory management.

Typically, the ESN model 18, with n-dimensional inputs and m reservoirs for a pixel 'k' in a training image is described by the following reservoir state update rule:

$$x_0^k(k)=(1-\alpha)x_{-1}^k(k)+\alpha f(W_{in}[1;u(k)]+Wx_{-1}^k(k)) \quad (4)$$

where this implicates the state vector of the reservoir for pixel 'k' with respect to its own pixel position in the current image, the reservoir state for pixel 'k' with respect to the same pixel position in the image that was processed before the current image, the leaky parameter, the input weight matrix, the reservoir weight matrix, the sigmoid function (usually tan h), and the input to the ESN network 18.

Figure 2:
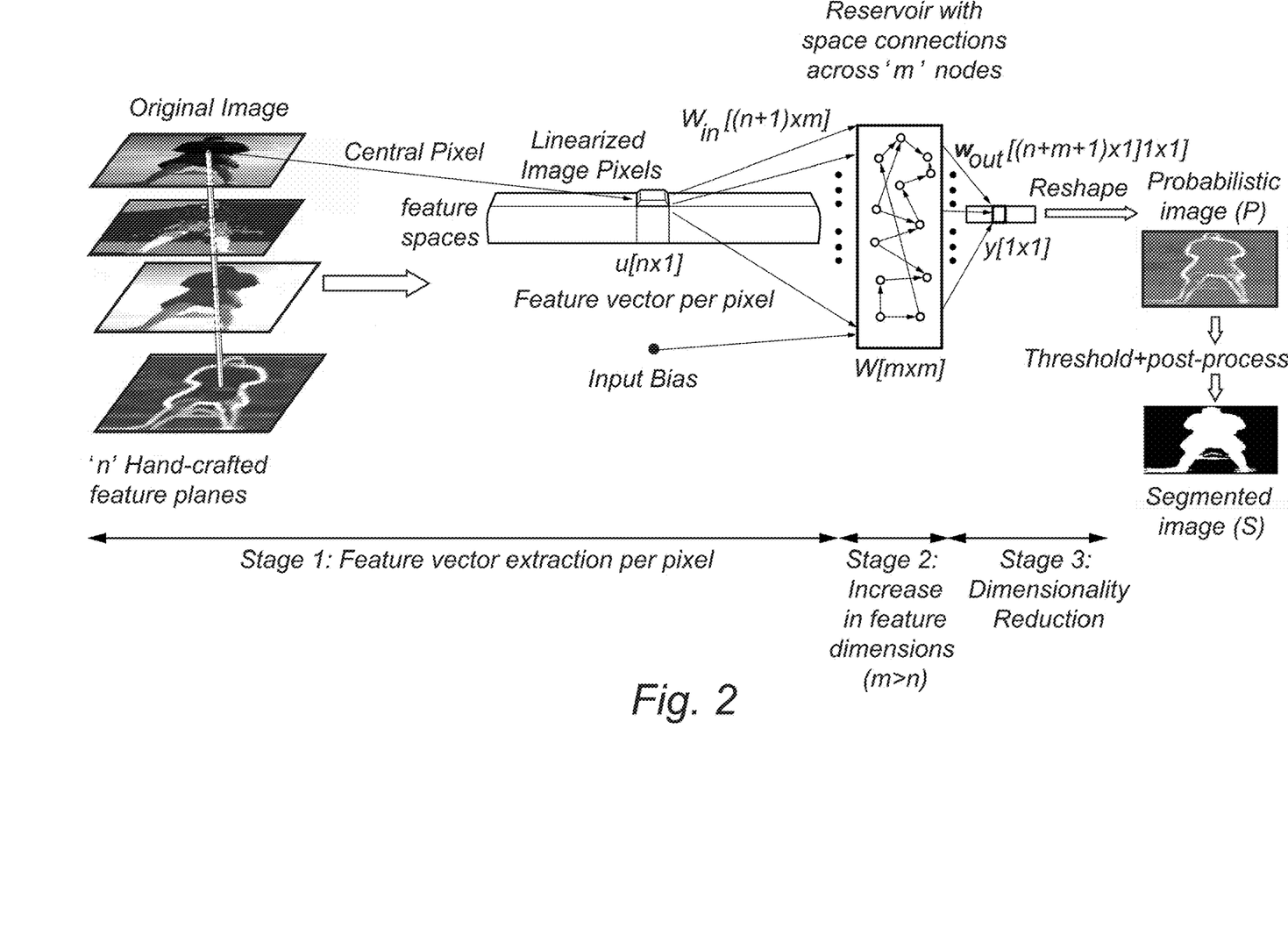
FIG. 2 is a schematic diagram illustrating the modified ESN framework for semantic segmentation tasks in stand-alone images and video frames of the present disclosure.

This reservoir state update rule assumes temporal behavior for each pixel position across a sequence of images, such as video sequence. A modified architecture is provided that incorporates spatial and temporal perturbations in the ESN reservoir states from pixel neighborhood in an image and across training images, respectively, as illustrated in FIG. 2, which illustrates the proposed ESN framework for semantic segmentation tasks in standalone images and video frames. In stage 1, n-dimensional input features are extracted for each pixel location, thereby resulting in feature matrix U. Stage 2 introduces increase in feature dimensionality for each pixel feature vector, given m>n, followed by dimensionality reduction in stage 3, thereby resulting in probabilistic output 'y' that is then resized and post-processed to generate segmented image S. For semantic segmentation in standalone images, a modified reservoir state update rule is provided for the ESN network 18 that can be described as:

$$x_0^k(k) = (1-\alpha)x_0^{k-1}(k) + \alpha f(W_{in}[1; u(k)] + Wx_{-1}^k(k)) \quad (5)$$

where this implicates the state vector of the reservoir for pixel 'k' with respect to pixel k−1 in the current image. The output obtained after the reservoir layer is read out is as follows:

$$y(k) = g(w_{out}^T z(k)) \quad (6)$$

where this implicates an activation function either identity for linear read out or any non-linear function (sigmoid, multi-layer perception, etc.), the extended system state, and the output weight matrix. The optimal output matrix weight can be obtained for one particular image by solving the following regularized least squared error optimization problem, which is written as:

$$\arg\min_{w_{out}} \|w_{out}^T z(k) - y(k)\|_2^2 + \lambda \|w_{out}\|_2^2 \quad (7)$$

where λ is the ridge parameter.

Considering multiple images in the training set, where each image is indexed, one can denote the extended state vector $z(k) = [1; u(k); x_0^k(k)]$ for the l-th image in the training dataset. Similarly, the output obtained for l-th image can be denoted and the extended states can be stacked from all the training images in the dataset. Accordingly, the output vector for all the training images is determined and the following minimization problem results:

$$\arg\min_{w_{out}} \|Z w_{out} - y\|_2^2 + \lambda \|w_{out}\|_2^2 \quad (8)$$

The solution for the optimization problem can be written in closed form as:

$$w_{out}^* = \left(\sum_{l=1}^{L} z_l(k) z_l^T(k) + \lambda I\right)^{-1} \left(\sum_{l=1}^{L} z_l(k) y(k)\right) \quad (9)$$

Thus, ESNs trained by a batch of training images can then be utilized to generate probabilistic linear outcomes (y) for each test image. Y can then be resized to original image dimensions as ESN predicted probabilistic image P. Image P can then be thresholded at the pixel level, followed by minor post-processing, such as discarding small areas then hole-filling or bounding box estimation, to generate a binary segmented mask S corresponding to the segmented ROI (see FIG. 2). The ESN parameters that are empirically estimated based on existing works and supplied to the model are: network leak rate for reservoir states, network spectral radius, number of reservoir nodes, and sparsity of randomly connected reservoir weights. Also, the randomly initialized weights assigned to the ESN are included.

The ESN framework of the present disclosure can be described in terms of implementation steps and input feature extraction steps.

Regarding the implementation steps, assuming that each image in the training set is resized, the ESN initialization step proceeds with ESN weight matrices being randomly initialized in a range. In the training step, for each training image, the input feature matrix and desired segmentation output are used to update the ESN reservoir states per pixel location, vectors, and batch-sums. At the end of the training process, the output weights $w^*_{out}$ is evaluated. In the testing step, the input feature matrix per image U and reservoir state matrix X are used to generate the extended state vector per pixel location followed by evaluation of the probabilistic output (y) This batch-training process for evaluation of $w^*_{out}$ along with the use of reservoir state matrix X and the reservoir update rule lead to a modified ESN framework that can learn a variety of segmentation objectives.

Regarding the input feature extraction steps, for each image, n handcrafted image planes are derived, e.g., RGB, while some other color planes that can provide significant region segmentation features, such as median-filtered gray scale image planes, gradient-filtered gray scale image planes, the HSL, HSV, and Lab color planes, respectively, can be used. For the baseline ESN model, the input feature extraction process is depicted in stage 1 of FIG. 2, where a feature readout function is invoked to stack pixel intensities from n-feature planes corresponding to each pixel position into input feature vector u.

Figure 3:
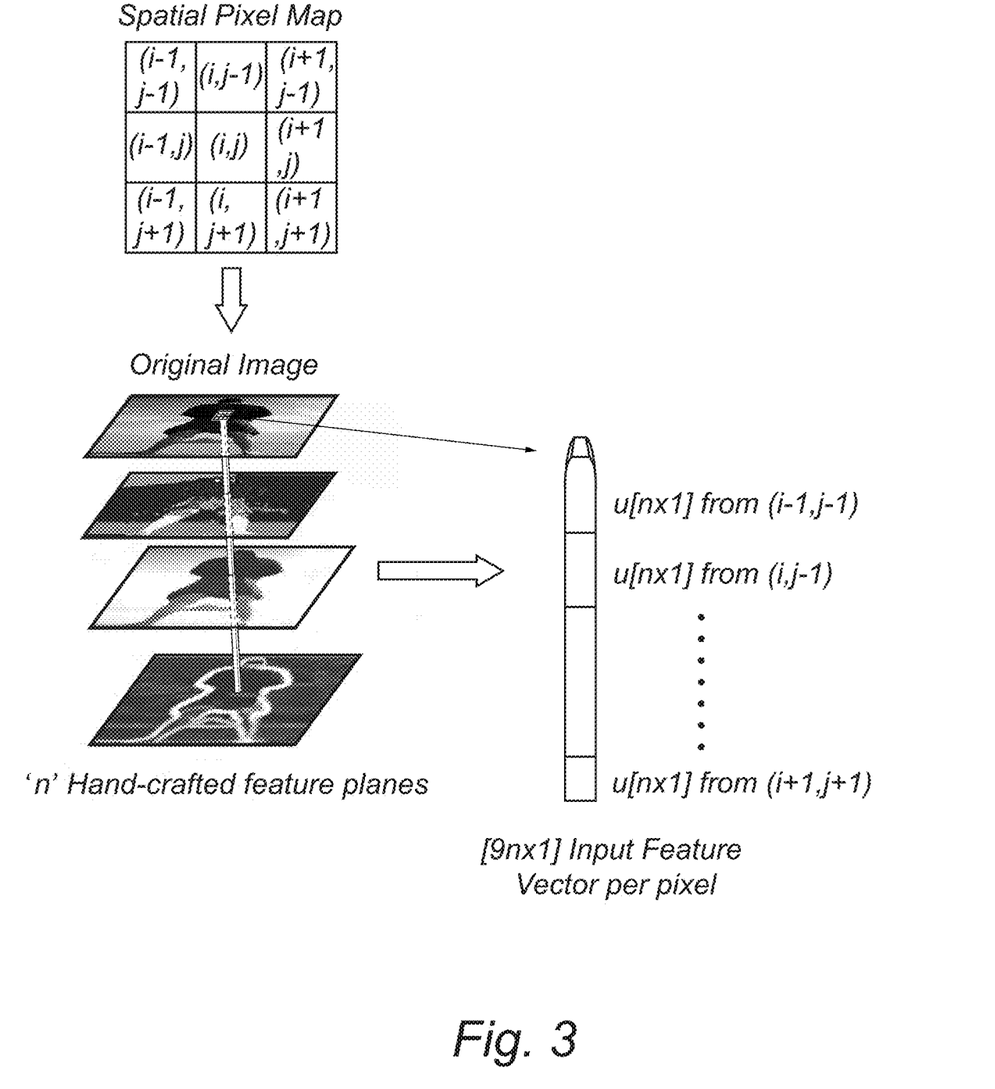
FIG. 3 is a schematic diagram illustrating an input feature extraction process per pixel position (i, j) using the modified ESN model of the present disclosure to include 3×3 neighborhood contributions, the spatial neighborhood capturing a larger receptive field and extraction of higher order abstract features in later stages of the ESN framework.

For the modified ESN model 18, contributions due to neighboring pixels for the input feature vectors are considered important. This notion is motivated by the use of 2D-spatial kernels in deep learning models that capture increasing receptive fields across layers. This modification is shown in FIG. 3, where the contributions of a 3×3 spatial grid around each pixel is used to generate the input feature vector per pixel. Similarly, for a larger neighborhood contribution, a spatial grid of dimensions d×d can be applied around each pixel, where d=3, 5, 7, 9, etc., such that the total number of features extracted per pixel position would be of dimension $d^2 \times n$.

Figure 4:
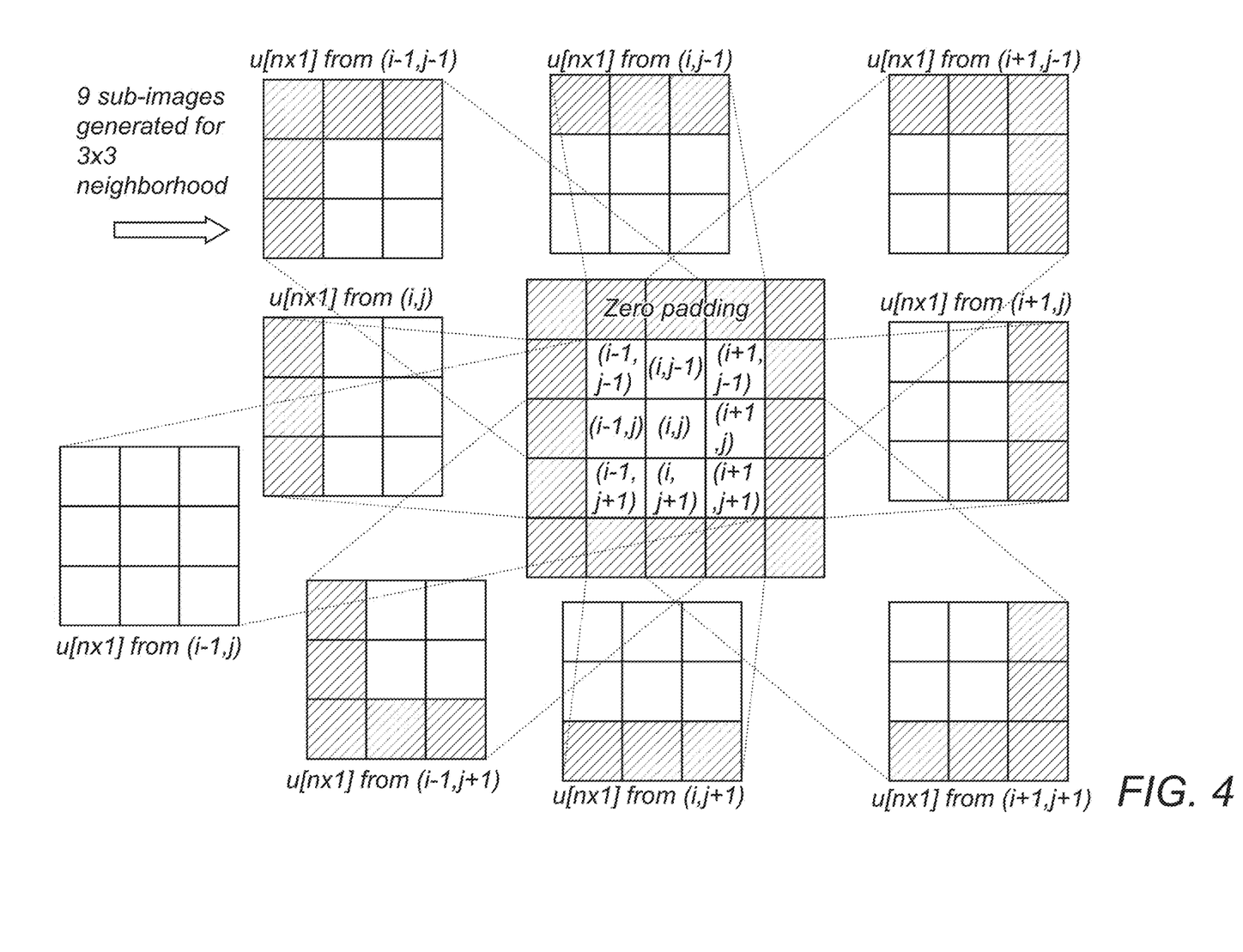
FIG. 4 is a schematic diagram illustrating an input feature extraction method for the modified ESN model of the present disclosure considering a (d=3) 3×3 spatial neighborhood per pixel.

Although extraction of neighborhood pixel lends important spatial information for segmentation purposes, the process of querying the 2-D neighborhood for each pixel to generate the $d^2 \times n$-dimensional feature vector can incur significant computational time complexity. Thus, to facilitate fast neighborhood feature extraction per pixel, a function overloading mechanism is used to readout the feature vector u(k) per pixel k as illustrated in FIG. 4.

Input feature extraction for the modified ESN network 18 proceeds with, for each input image, the left-right-top-bottom edges being padded with d/2 columns/rows of zeros, respectively. Next, a cropping function is invoked that generates $d^2$ sub-images of size [a×b] from this zero-padded image. For e.g., the 1st cropped sub-image corresponds to top left (i−1,j−1) corner neighbor of each image pixel, the 2nd cropped sub-image corresponds to pixels to the top (i,j−1) of each image pixel and so on. Finally, the aforementioned feature readout function is overloaded to generate [n×1] feature vectors corresponding to each pixel location from the $d^2$ sub-images generated from the cropping function. This function overloading process incurs significantly low computational complexity due to the constant feature readout function implementation. However, it is noteworthy that as the spatial neighborhood size (d) increases, the time complexity for input feature extraction by the modified ESN 18 increases due to the cropping function.

In evaluating the results of the methods and systems of the present disclosure, the goal is the segmentation of a ROI and every pixel that belongs to the ROI and is detected as the ROI is called a true positive, TP. Every pixel that is actually a part of the ROI, but is missed by the proposed framework is called false negative, FN. Every pixel that is not a part of the ROI, but is falsely detected as part of the ROI by the proposed framework is called a false positive, FP. Thus, the following may be used:

$$F(F\text{-score})=2TP/(2TP+FP+FN) \text{ [higher is better]} \quad (10)$$

$$IoU \text{ (intersection over union)}=TP/(TP+FP+FN)$$
$$\text{[higher is better]} \quad (11)$$

$$TPR/\text{recall/sensitivity (true positive rate)}=TP/(TP+FN) \text{ [higher is better]} \quad (12)$$

$$FDR \text{ (false detection rate)}=FP/(FP+TP)\text{[lower is better]} \quad (13)$$

Figure 5:
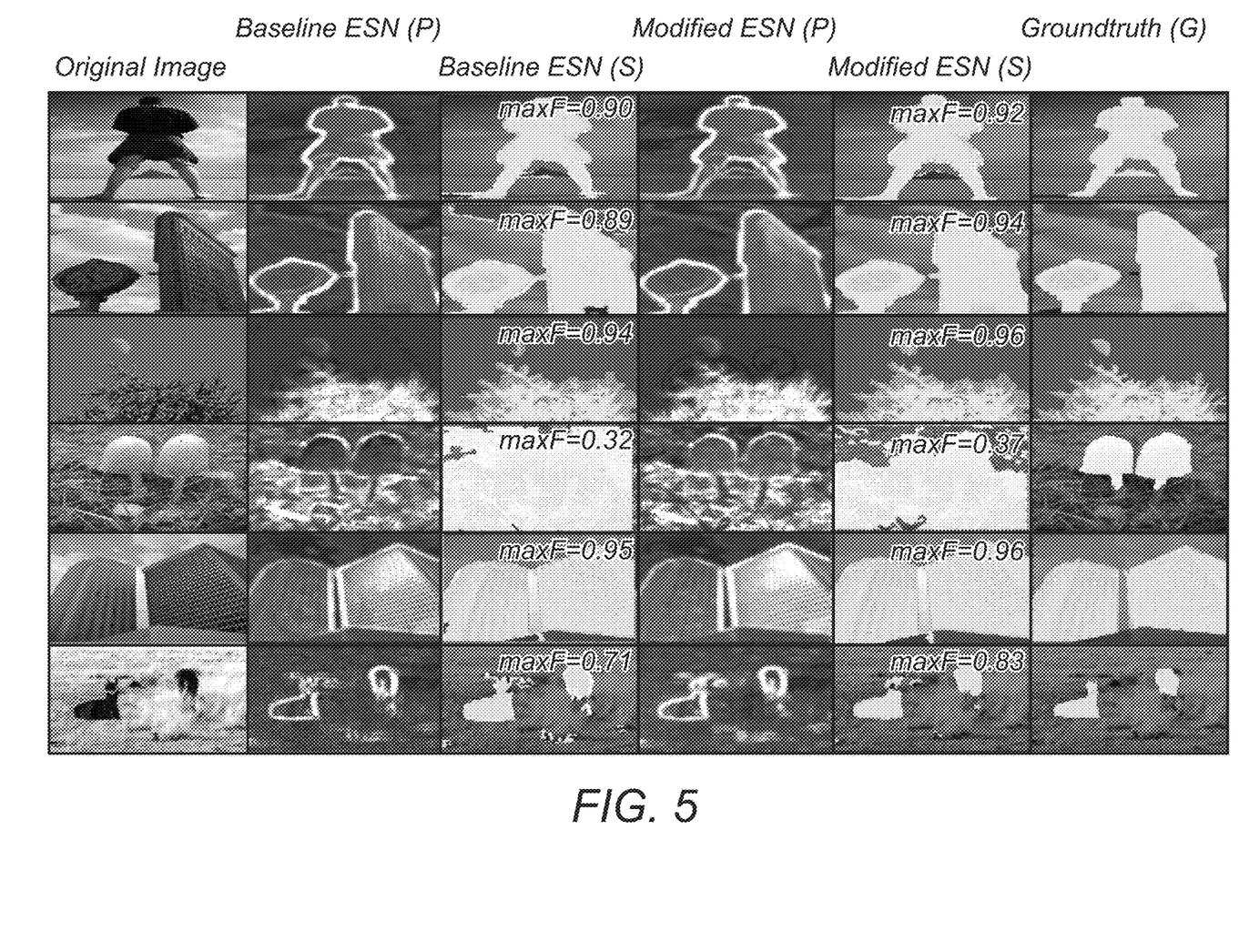
FIG. 5 is a series of images illustrating the performance of object detection implementing the systems and methods of the present disclosure in terms of maximum F-score on a public Weizmann 2 dataset.

FIG. 5 is a series of images illustrating the performance of object detection implementing the systems and methods of the present disclosure in terms of maximum F-score on a public Weizmann 2 dataset.

Figure 6:
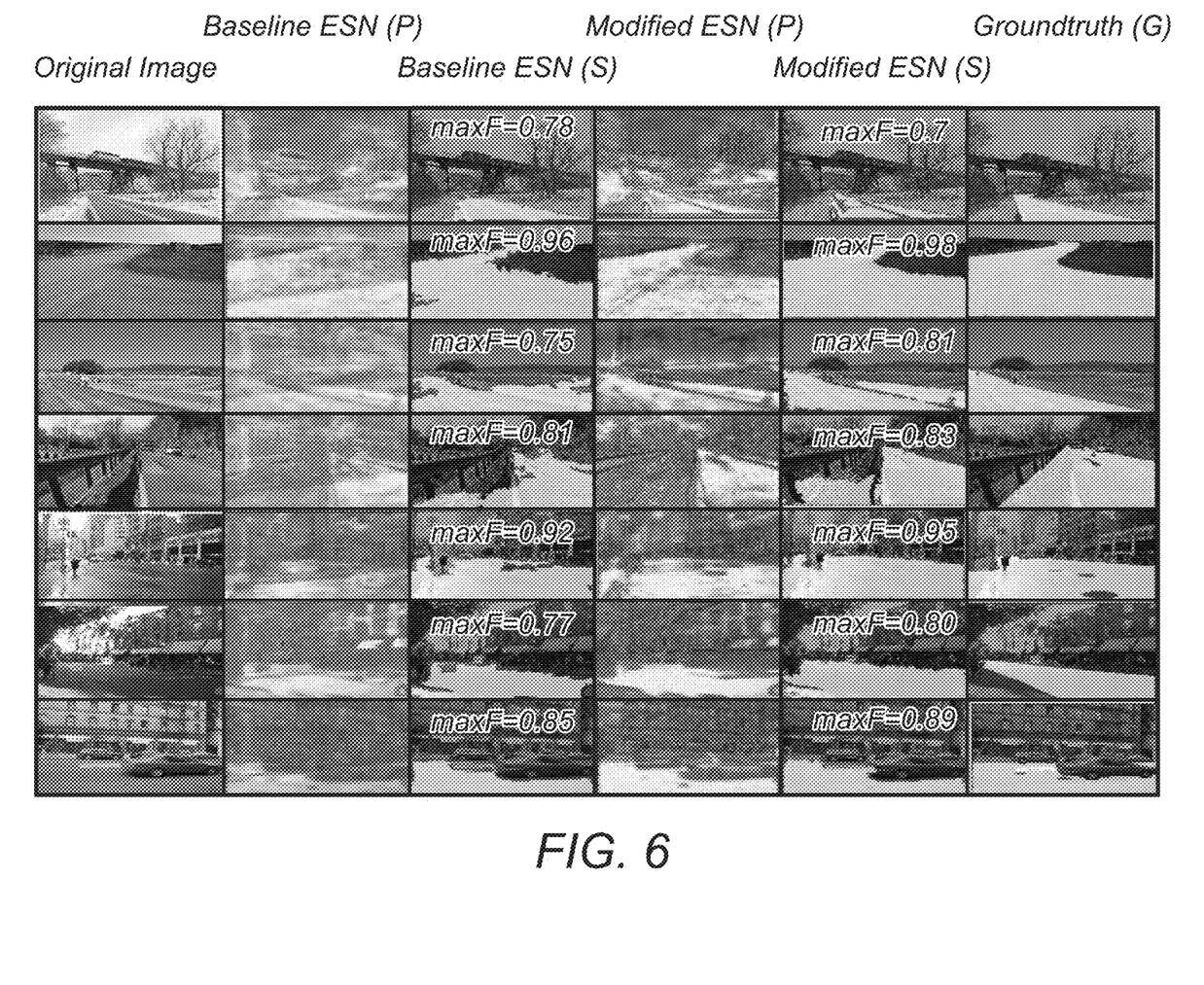
FIG. 6 is a series of images illustrating the performance of drivable surface segmentation implementing the systems and methods of the present disclosure in terms of maximum F-score on a public ADE Challenge dataset.

FIG. 6 is a series of images illustrating the performance of drivable surface segmentation implementing the systems and methods of the present disclosure in terms of maximum F-score on a public ADE Challenge dataset.

Figure 7:
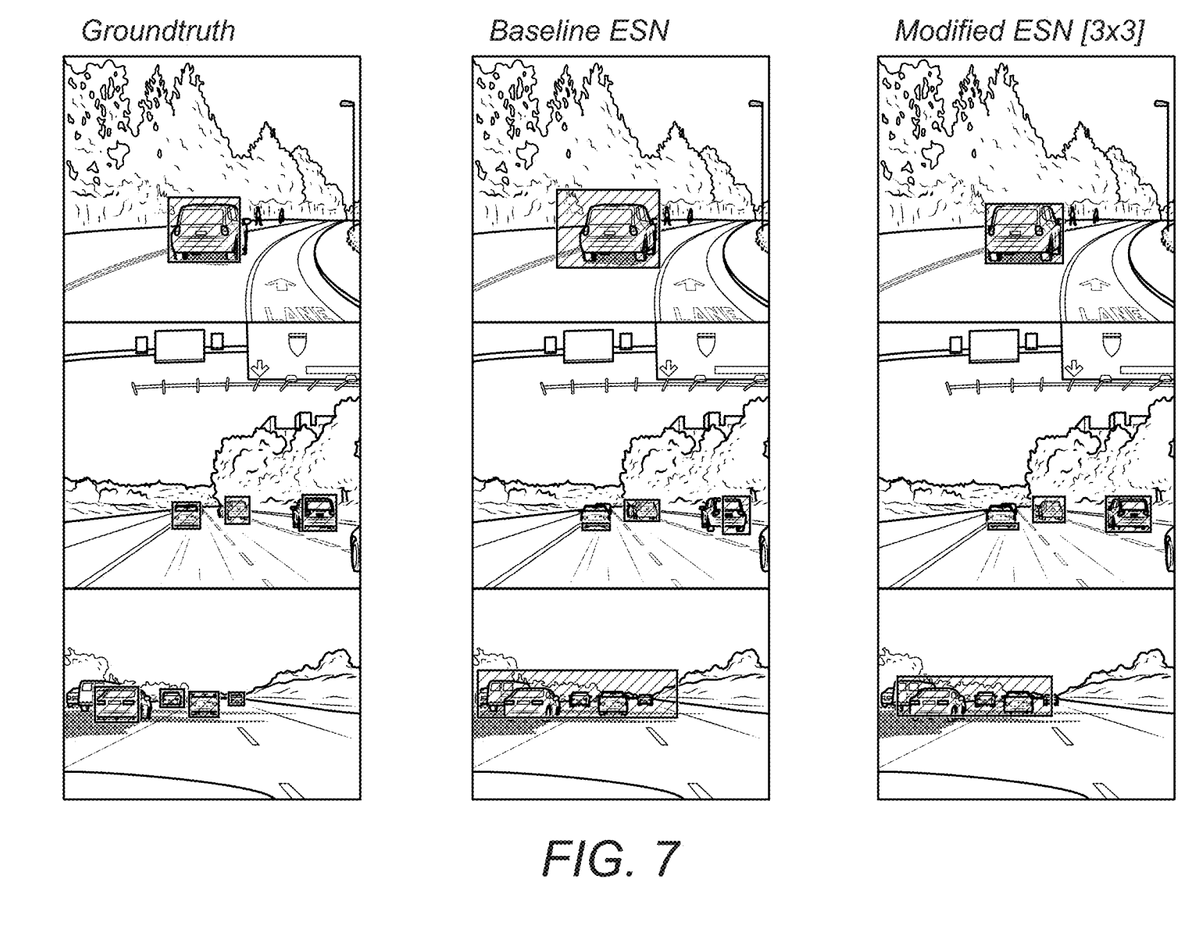
FIG. 7 is a series of images illustrating the performance of object tracking implementing the systems and methods of the present disclosure on a public LISA dataset.

FIG. 7 is a series of images illustrating the performance of object tracking implementing the systems and methods of the present disclosure on a public LISA dataset.

Figure 8:
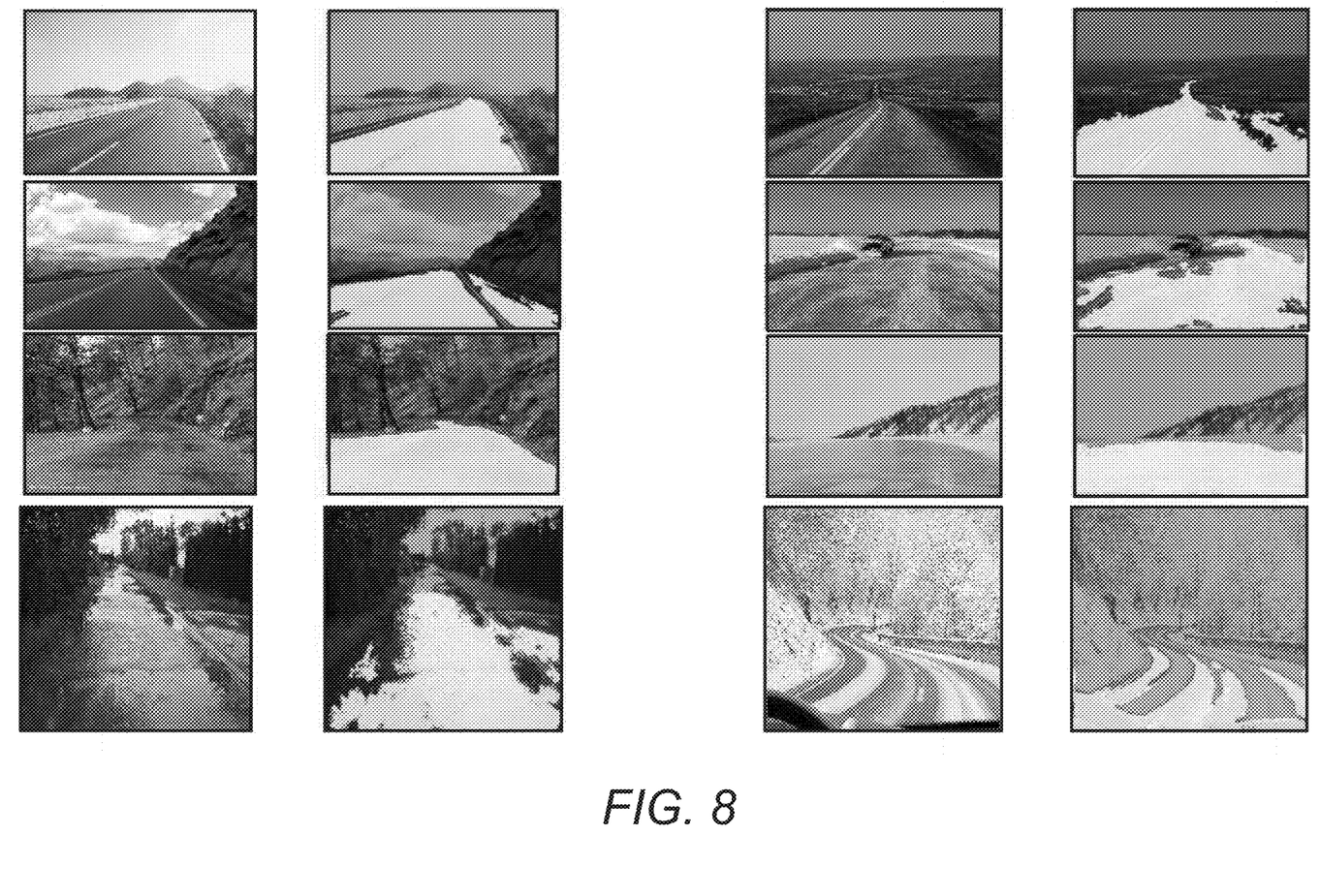
FIG. 8 is a series of images illustrating the performance of the methods and systems of the present disclosure for drivable surface segmentation on public data images for various weather conditions.

FIG. 8 is a series of images illustrating the performance of the methods and systems of the present disclosure for drivable surface segmentation on public data images for various weather conditions.

Figure 9:
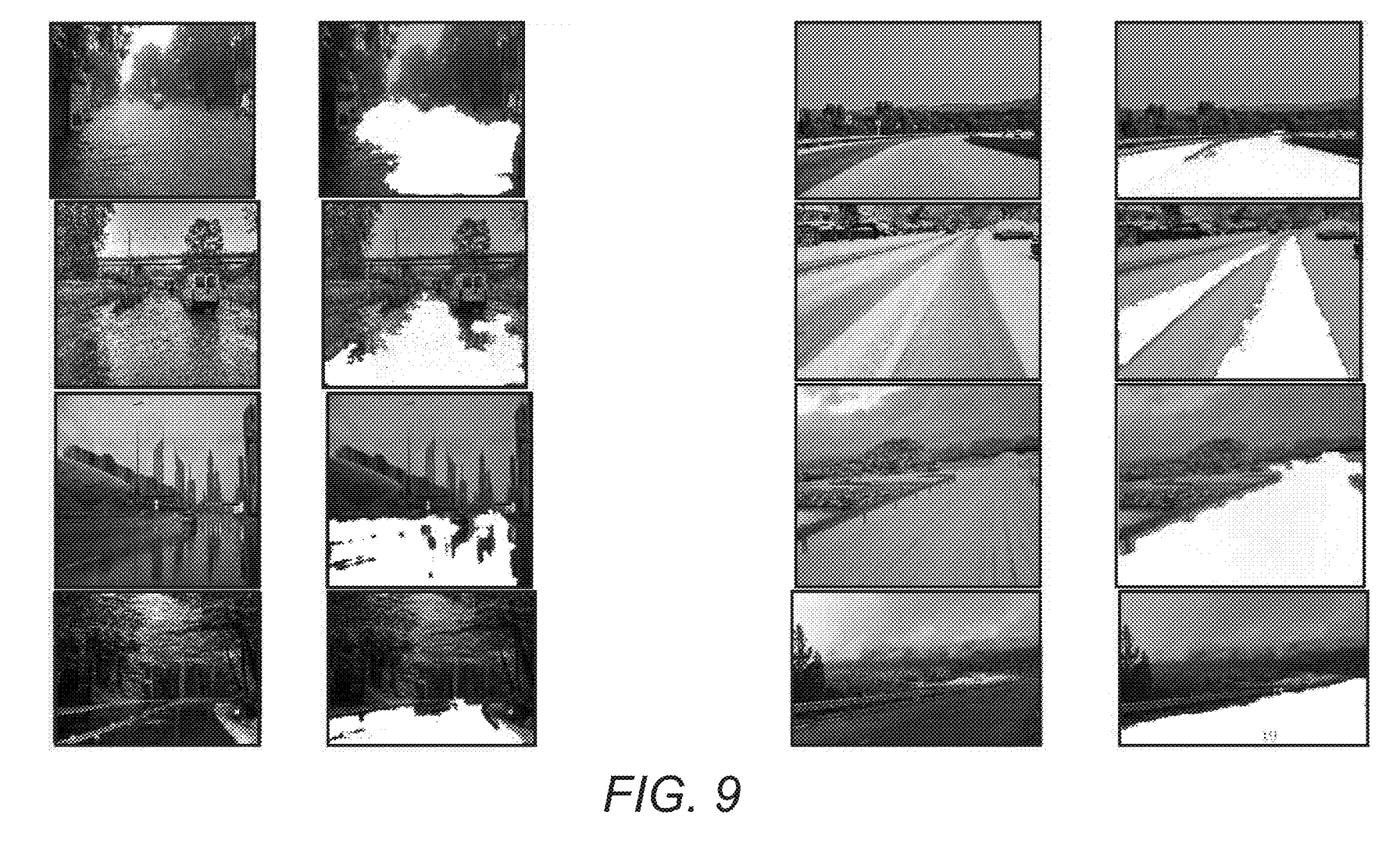
FIG. 9 is another series of images illustrating the performance of the methods and systems of the present disclosure for drivable surface segmentation on public data images for various weather conditions.

FIG. 9 is another series of images illustrating the performance of the methods and systems of the present disclosure for drivable surface segmentation on public data images for various weather conditions.

Figure 10:
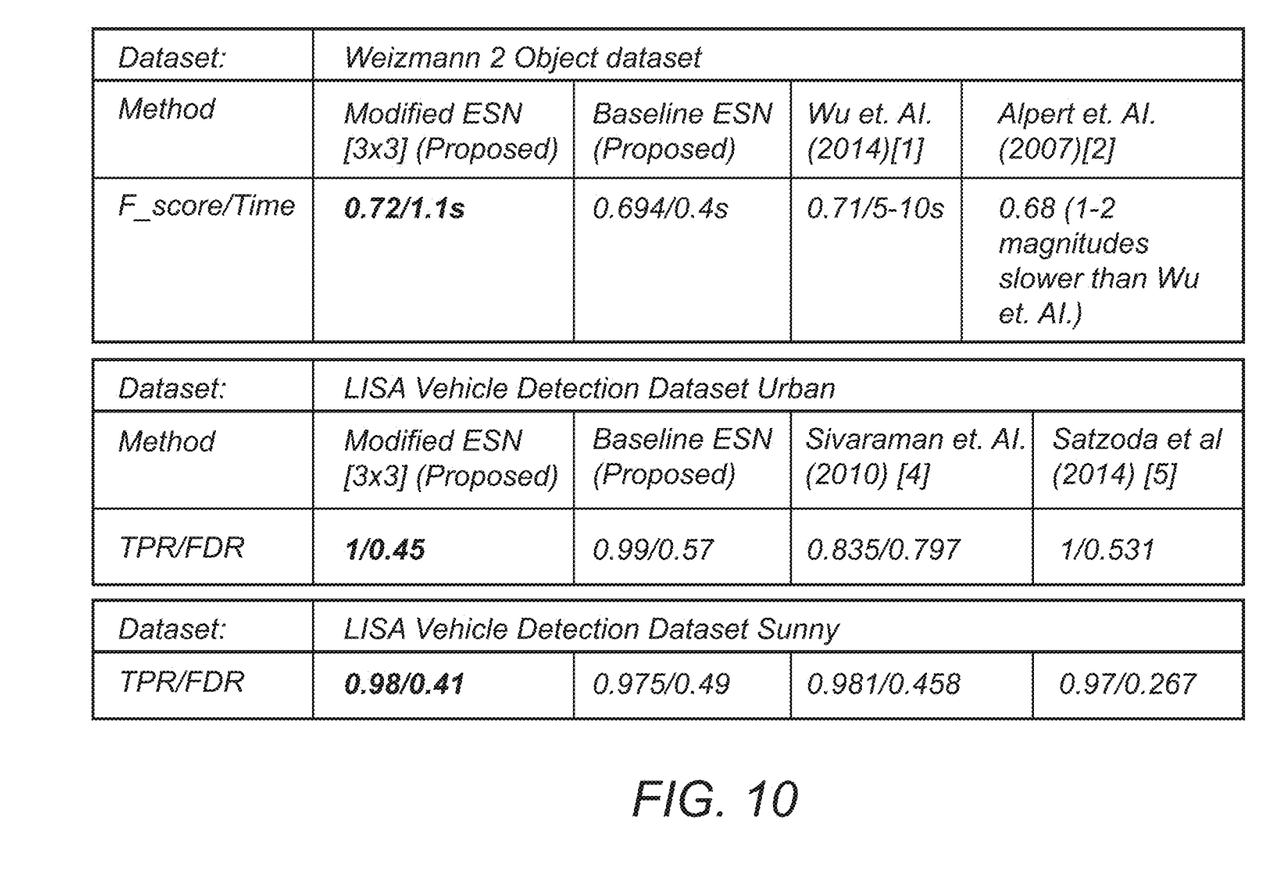
FIG. 10 is a table providing the comparative segmentation performance of the methods and systems of the present disclosure relative to other conventional methodologies.

FIG. 10 is a table providing the comparative segmentation performance of the methods and systems of the present disclosure relative to other conventional methodologies.

Preferably, the software application/algorithm/method of the present disclosure is implemented as coded instructions stored in a memory and executed by a processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory, to communicate data to and from the memory, and to generally control operations pursuant to the coded instructions. In an exemplary embodiment, the processor may include a mobile optimized processor, such as one optimized for power consumption and mobile applications. Input/output (I/O) interfaces can be used to receive user input and/or for providing system output. User input can be provided via, for example, a keypad, a touch screen, a scroll ball, a scroll bar, buttons, a voice-activation system, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a graphical user interface (GUI) that enables the user to interact with the memory. Additionally, the I/O interfaces may further include an imaging device, i.e. the camera(s), etc.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionalities.

Although the present disclosure is illustrated and described herein with reference to aspects and examples thereof, it will be readily apparent to persons of ordinary skill in the art that other aspects and examples may perform similar functions and/or achieve like results. All such equivalent aspects and examples are within the spirit and scope of the present disclosure, are contemplated thereby, and are intended to be covered by the following non-limiting claims for all purposes.

What is claimed is:

1. A method, comprising:
   extracting one or more image planes from an input image, wherein the input image is to be segmented for a region of interest;
   linearizing each of the one or more image planes to generate a one-dimensional array corresponding to the one or more image planes;
   abstracting features for the region of interest using a modified echo state network model incorporating spatial and temporal features from within the image and from across a batch of training images with similar orientations and segmentation objectives; and
   based on the extracting, linearizing, and feature abstracting, providing a fast semantic proposal for image or video annotation using a reduced dataset.

2. The method of claim 1, wherein linearizing each of the one or more image planes to generate the one-dimensional array corresponding to the one or more image planes comprises extracting an input feature vector per image pixel for the one or more image planes.

3. The method of claim 1, wherein abstracting the features for the region of interest using the modified echo state network model comprises utilizing a reservoir including a layer of connections between reservoir nodes, wherein the reservoir increases feature dimensions per pixel location to multiple dimensions followed by feature reduction to one dimension per pixel location, wherein the echo state network model comprises both spatial and temporal state factors for the reservoir nodes associated with each pixel vector, and wherein the echo state network model outputs a probability image that is thresholded.

4. The method of claim 1, wherein the region of interest comprises one or more of a portion or whole of a foreground or background object, a drivable surface, and a trackable object.

5. The method of claim 1, wherein the one or more image planes comprise one or more of a red-green-blue image plane, a median-filtered grayscale image plane, a gradient-filtered grayscale image plane, a hue-saturation-lightness color plane, a hue-saturation-value color plane, a Lab color plane, a YUV color plane, a YCbCr color plane, and a filtered image plane.

6. The method of claim 1, wherein the echo state network model incorporates spatial characteristics from both neighboring pixels in a same input image and similar pixels from a previous input image.

7. The method of claim 1, wherein the input image is part of a batch of data selected from a larger dataset of frames and only the batch of data is used to form the semantic proposal image.

8. The method of claim 1, wherein the echo state network model utilizes contributions of a dxd spatial grid around each pixel to generate an input feature vector per pixel, such that a total number of features extracted per pixel location is of dimension $d^2 \times n$.

9. The method of claim 1, wherein the echo state network model utilizes a function overloading mechanism to readout a feature vector per pixel by padding edges of an image with columns/rows of zeros to form a zero-padded image and invoking a cropping function to generate sub-images from the zero-padded image and overloading a feature readout function to generate feature vectors corresponding to each pixel location from the sub-images generated by the cropping function.

10. The method of claim 1, wherein the semantic proposal image is used to train or test one or more of a driver assist system and an autonomous driving system.

11. A system, comprising:
memory storing extraction instructions executed by a processor to extract one or more image planes from an input image, wherein the input image is to be segmented for a region of interest;
the memory storing linearization instructions executed by the processor to linearize each of the one or more image planes to generate a one-dimensional array corresponding to the one or more image planes;
the memory storing feature abstraction instructions executed by the processor to abstract features for the region of interest using a modified echo state network model incorporating spatial and temporal features from within the image and from across a batch of training images with similar orientations and segmentation objectives; and
the memory storing fast semantic proposal instructions executed by the processor to, based on the extracting, linearizing, and feature abstracting, provide a fast semantic proposal for image or video annotation using a reduced dataset.

12. The system of claim 11, wherein the linearization instructions are operable for linearizing each of the one or more image planes to generate the one-dimensional array corresponding to the one or more image planes by extracting an input feature vector per image pixel for the one or more image planes.

13. The system of claim 11, wherein the feature abstraction instructions are operable for abstracting the features for the region of interest using the modified echo state network model by utilizing a reservoir including a layer of connections between reservoir nodes, wherein the reservoir increases feature dimensions per pixel location to multiple dimensions followed by feature reduction to one dimension per pixel location, wherein the echo state network model comprises both spatial and temporal state factors for the reservoir nodes associated with each pixel vector, and wherein the echo state network model outputs a probability image that is thresholded.

14. The system of claim 11, wherein the region of interest comprises one or more of a portion or whole of a foreground or background object, a drivable surface, and a trackable object.

15. The system of claim 11, wherein the one or more image planes comprise one or more of a red-green-blue image plane, a median-filtered grayscale image plane, a gradient-filtered grayscale image plane, a hue-saturation-lightness color plane, a hue-saturation-value color plane, a Lab color plane, a YUV color plane, a YCbCr color plane, and a filtered image plane.

16. The system of claim 11, wherein the echo state network model incorporates spatial characteristics from both neighboring pixels in a same input image and similar pixels from a previous input image.

17. The system of claim 11, wherein the echo state network model utilizes contributions of a dxd spatial grid around each pixel to generate an input feature vector per pixel, such that a total number of features extracted per pixel location is of dimension $d^2 \times n$.

18. The system of claim 11, wherein the echo state network model utilizes a function overloading mechanism to readout a feature vector per pixel by padding edges of an image with columns/rows of zeros to form a zero-padded image and invoking a cropping function to generate sub-images from the zero-padded image and overloading a feature readout function to generate feature vectors corresponding to each pixel location from the sub-images generated by the cropping function.

19. A non-transitory computer-readable medium comprising fast semantic image annotation proposal instructions stored in memory and executed by a processor to perform the steps comprising:
extracting one or more image planes from an input image, wherein the input image is to be segmented for a region of interest;
linearizing each of the one or more image planes to generate a one-dimensional array corresponding to the one or more image planes;
abstracting features for the region of interest using a modified echo state network model incorporating spatial and temporal features from within the image and from across a batch of training images with similar orientations and segmentation objectives; and
based on the extracting, linearizing, and feature abstracting, providing a fast semantic proposal for image or video annotation using a reduced dataset.

20. The non-transitory computer-readable medium of claim 19, wherein:
the step of linearizing each of the one or more image planes to generate the one-dimensional array corresponding to the one or more image planes comprises extracting an input feature vector per image pixel for the one or more image planes; and the step of abstracting the features for the region of interest using the modified echo state network model comprises utilizing a reservoir including a layer of connections between reservoir nodes, wherein the reservoir increases feature dimensions per pixel location to multiple dimensions followed by feature reduction to one dimension per pixel location, wherein the echo state network model comprises both spatial and temporal state factors for the reservoir nodes associated with each pixel vector, and wherein the echo state network model outputs a probability image that is thresholded.

* * * * *